Nov. 16, 1943.  R. M. HEINTZ ET AL  2,334,264
GYRO WHEEL
Filed Nov. 14, 1942

INVENTORS
RALPH M. HEINTZ
BERT G. CARLSON
BY Frank H Harmon
ATTORNEY

Patented Nov. 16, 1943

2,334,264

UNITED STATES PATENT OFFICE 2,334,264

GYRO WHEEL

Ralph M. Heintz, Cleveland, and Bert G. Carlson, Erieside, Ohio, assignors to Jack & Heintz, Inc., Bedford, Ohio, a corporation of Ohio Application November 14, 1942, Serial No. 465,602

1 Claim. (Cl. 253—50)

This invention relates to improvements in gyros and has for its object to provide a gyro wheel that will be light in weight but so constructed with the maximum of its weight concentrated at its periphery so as to have the maximum efficiency as a spinning gyro with the minimum force necessary to keep it spinning.

With the foregoing and other objects in view, the invention resides in the combination of parts and the details of construction hereinafter set forth in the following specification and appended claim, certain embodiments thereof being illustrated in the accompanying drawing in which:

Figure 1:
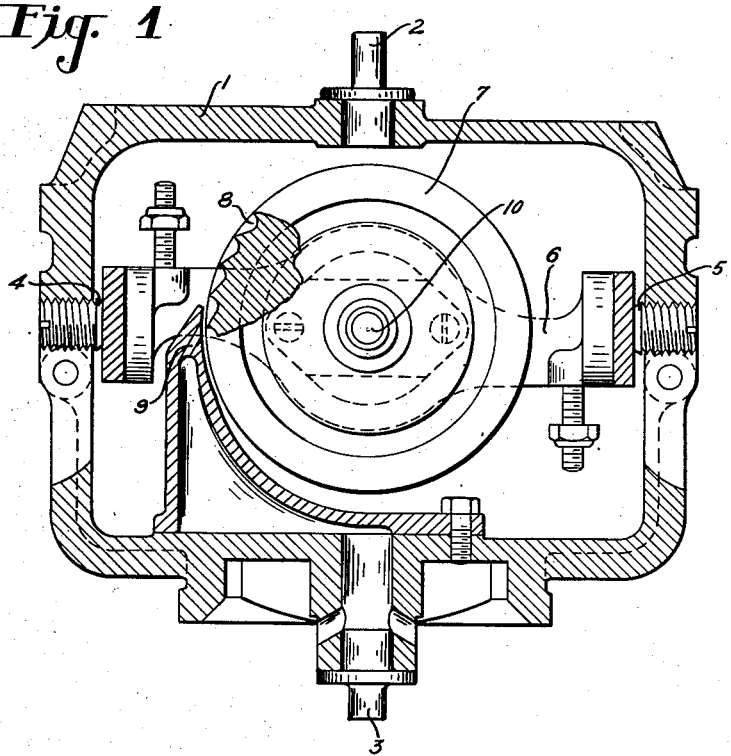
Figure 1 is a top plan view of a gyro assembly partly broken away to show part of the vertical axis gyro wheel and showing its gimbal supports in transverse section.
Figure 2:
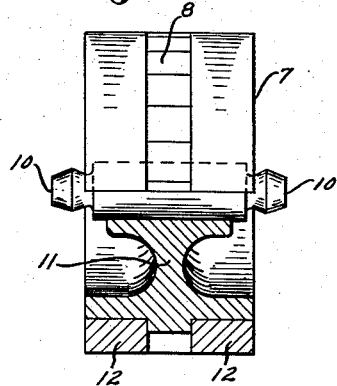
Figure 2 is a view in end elevation, partly in section, of the gyro wheel with the tungsten rim applied.

Referring more particularly to the drawing, for illustrative purposes a vertical axis gyro assembly is shown including a gimbal support 1 with its trunnions 2 and 3. This ring 1 is provided with adjustable trunnions 4 and 5 to be received in suitable bearings of the gimbal support 6. The gyro wheel is generally indicated at 7 and a portion is shown partly broken away to show the gyro wheel buckets 8 adjacent the air nozzle 9 for impelling the gyro wheel to rotation about its vertical axis.

In gyroscopic instruments and automatic pilots for aircraft it has been found expedient to utilize such light weight material as aluminum or magnesium for the gyro wheel supports in order to obtain overall lightness of the instrument or automatic pilot. It is also preferable to reduce the weight of the gyro wheel as much as possible but without interfering with the proper distribution of weight which makes for efficiency of the gyro in its spinning rotation so as to at all times maintain its proper axis of rotation.

Figure 3:
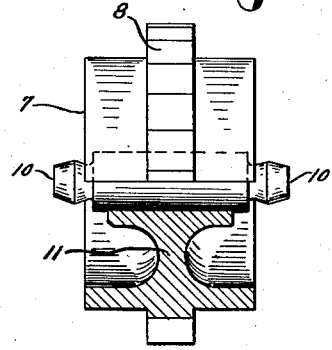
Figure 3 is an end view, partly in section, of the gyro wheel main body casting, prior to the application of the tungsten rim.

According to the present invention it is proposed to cast the main body portion of the gyro wheel 7 of aluminum or magnesium including the peripheral buckets 8, as shown in Figure 3, and to decrease the overall dimensions of the gyro wheel by decreasing its thickness from its rotational axis 10 throughout the area 11 with an outward bevel toward the outer rim, in order to reduce the overall weight of the gyro wheel. In order to concentrate the necessary weight for setting up centrifugal forces for maintaining proper speed and axis of rotation a band 12 of uniform thickness of metal of high specific gravity is fitted to the periphery of the wheel on either side of that occupied by the buckets 8 and of sufficient thickness to have their peripheries substantially flush with the buckets. In selecting such a metal of high specific gravity it has been found that tungsten not only is one that is adaptable in application but highly efficient in operation for the intended purpose of concentrating the weight at the periphery of the gyro wheel for efficiency of rotation due to centrifugal forces.

Such a construction is moreover much more satisfactory and efficient than the conventional practice of using gyro wheels of relatively greater bulk and weight without sufficient appreciation of the fact that the concentration of the weight at the gyro wheel periphery is the controlling factor for efficiency.

We claim:

In a gyro apparatus, a gyro wheel having centrally located peripheral buckets and means for discharging fluid into said buckets to spin said gyro about its axis, said wheel having a relatively thin main body portion and wide rim portion made of magnesium in the form of a casting including said buckets and a band of tungsten secured to said rim portion on either side of said centrally located peripheral buckets.

RALPH M. HEINTZ.
BERT G. CARLSON.